United States Patent
Liu et al.

(10) Patent No.: US 9,600,858 B1
(45) Date of Patent: Mar. 21, 2017

(54) VISUALLY COMFORTABLE CONTENT-ADAPTIVE DITHERING FOR SUPER-RESOLUTION

(71) Applicant: Pixelworks, Inc., Portland, OR (US)

(72) Inventors: Guodong Liu, Shanghai (CN); Bob Zhang, Santa Clara, CA (US); Yue Ma, Pleasanton, CA (US); Junhua Chen, Shanghai (CN)

(73) Assignee: PIXELWORKS, INC., Portland, OR (US)

( * ) Notice: Subject to any disclaimer, the term of this patent is extended or adjusted under 35 U.S.C. 154(b) by 554 days.

(21) Appl. No.: 14/056,768

(22) Filed: Oct. 17, 2013

(51) Int. Cl.
*G06T 3/40* (2006.01)

(52) U.S. Cl.
CPC .................. *G06T 3/4053* (2013.01)

(58) Field of Classification Search
CPC .................................................. G06T 3/4053
USPC ........................................ 382/254, 274, 299
See application file for complete search history.

(56) References Cited

U.S. PATENT DOCUMENTS

| | | | |
|---|---|---|---|
| 6,178,011 B1* | 1/2001 | Lin | G06T 3/403 358/1.9 |
| 8,750,390 B2* | 6/2014 | Sun | H04N 7/26058 375/240.29 |
| 2005/0152005 A1* | 7/2005 | Damera-Venkata | H04N 1/4055 358/3.13 |
| 2007/0153332 A1* | 7/2007 | Kim | G06T 11/001 358/3.13 |
| 2014/0010478 A1* | 1/2014 | Ndiour | G06T 3/4007 382/300 |

\* cited by examiner

*Primary Examiner* — Ishrat I Sherali
(74) *Attorney, Agent, or Firm* — Marger Johnson

(57) ABSTRACT

A method of producing a high resolution image includes generating high resolution image data for a high resolution image using a processor, wherein the high resolution image has a resolution higher than a resolution of an original image, determining image content of the high resolution image data, and selectively adding dither noise to the high resolution image data based upon the image content of the high resolution image data to produce final image data.

14 Claims, 6 Drawing Sheets

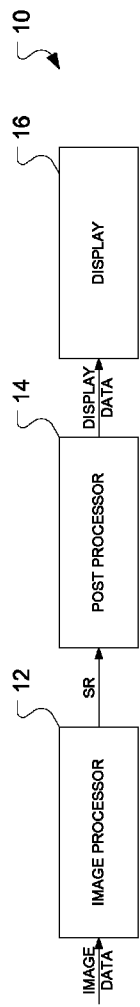
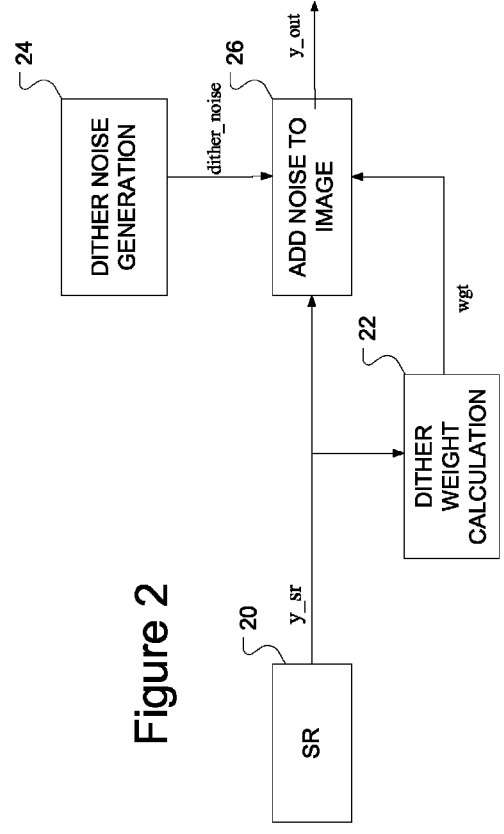
Figure 1
Figure 2

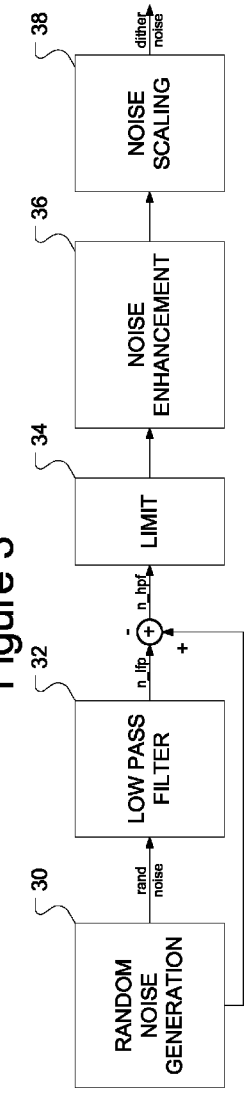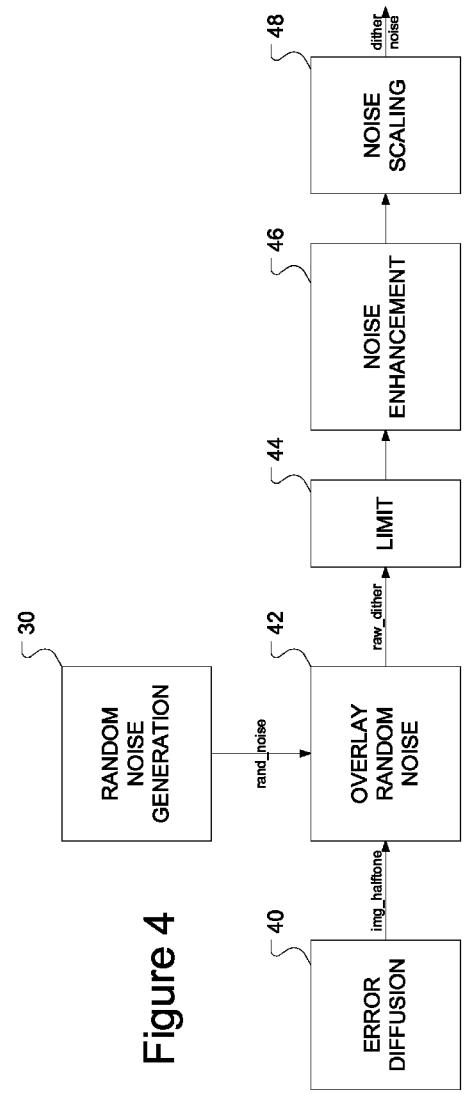

VISUALLY COMFORTABLE CONTENT-ADAPTIVE DITHERING FOR SUPER-RESOLUTION

BACKGROUND

Super resolution techniques allow delivery of high-quality images and video when the input sources are low resolution relative to the display. Ideally, super resolution techniques should recover details and maintain sharpness of edges on their own. In reality, artifacts crop up in the super resolution process. For example, some edges will have artificial sharpness, like the transition between two colors in oil paintings without the corresponding increase in overall detail. These artifacts may occur in upscaled images at higher resolutions than the original image. These images will be referred to as high resolution images, as no super resolution process is applied to obtain them.

Typically, some post-processing methods such as image enhancements will assist in alleviating these artifacts by enhancing what details remain. One example of post-processing image enhancement includes peaking, but even peaking cannot always add the details necessary to make the image look natural.

The process of dithering reduces quantization error and prevents large-scale patterns such as color banding image by adding noise to image before quantization. Dithering can use fixed patterns or random noise. Typically, it involves adding high frequency noise, often referred to blue noise. The term 'blue' generally refers to the power spectrum, wherein blue noise has very few or no low frequency components. Because it has very few or no low frequency components, the dither noise can substitute for the missing details and reduce or conceal artifacts including the oil painting effect discuss above.

BRIEF DESCRIPTION OF THE DRAWINGS

FIG. 1 shows an embodiment of an imaging system.

FIG. 2 shows an embodiment of a method of adding dither noise to a super resolution image based upon the image content.

FIGS. 3 and 4 show embodiments of methods of generating dither noise.

DETAILED DESCRIPTION OF THE EMBODIMENTS

Figure 5:
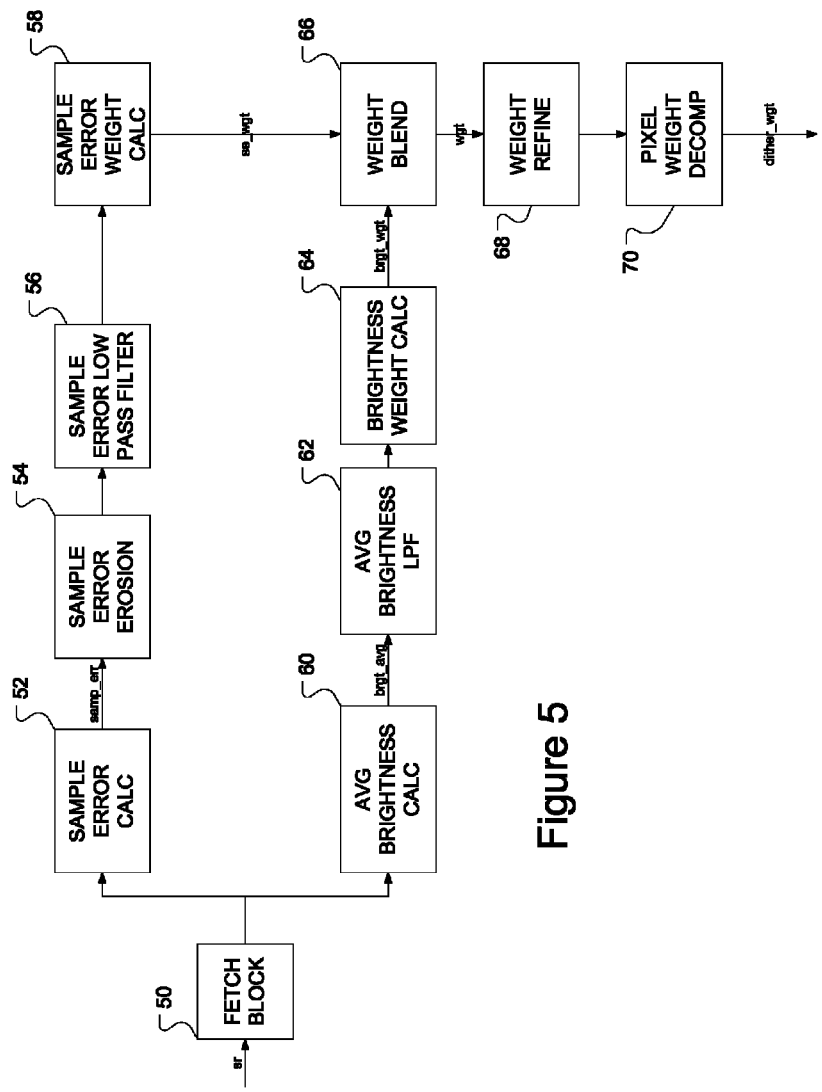
FIG. 5 shows an embodiment of a method to assign weight to image data for adding dither noise according to image contents.

FIG. 1 shows an embodiment of a display system 10. The image processor 12 receives image data from a data source. The data source may be one of any type of data sources, such as broadcast television, DVD player, digital video recorder (DVR), streaming content provider, etc. No limitation to any type of video image data source is intended nor should any be implied. The image processor takes the image data and prepares it for display, such as sharpening, enhancement, motion error, motion compensation, etc.

In systems in which the display system has a higher resolution than the resolution of the incoming image data, the image processor may generate the higher resolution data using a variety of methods. These may include single frame super resolution, multi-frame super resolution, self-similarity single frame super resolution, one-dimensional polyphase scaling (1D scaler), bi-cubic interpolation etc. Alternatively, the post processor 14 may generate the super resolution data or be included with the image processor.

In the embodiments discussed here, the post processor may also process the image data to remove or alleviate some artifacts in the scaled data. For example, when the super resolution process recovers the edges of an image but does not necessarily recover all of the details of the image data, the edges take on a 'hard' edge. This type of artifact is also possible with 1D or 2D scaling techniques when non-linear edge enhancement is used. A transition between colors results in an oil painting effect where the edge between the colors has no blending or mixing and is very sharp, but other than that, that section of the image lacks natural details. The display 16 then utilizes the post-processed data.

Some image processing techniques include the addition of dither noise to the image data to break up image bands and other artifacts that may occur. For example, in printing, many types of printers dispense ink or toner in droplets, where the system either dispenses a drop or not. A pixel on a printed image may encompass enough spatial area to include several drops or lack of drops. The pixel area has enough space that may be filled with drops of ink, have no drops of ink, or some number in between. The human eye resolves the number of drops, or amount, of ink in a pixel area as a shade of gray or color. When processing images, the same effect can occur if there are not enough quantization levels for each color. This process of dispensing some number of drops into the pixel area is referred to as halftoning. Similar techniques exist in video processing, but typically module the colors over time, rather than over space.

One issue that can arise in these techniques, for example, is image banding. The resulting image appears to have bands of color or gray in certain regions. Other issues can arise because the resulting pixel value displayed or printed varies from the actual value desired. This difference can be 'diffused' out to neighboring pixels, which may further cause other artifacts, referred to as error diffusion.

One technique used to alleviate this issue applies random noise to the image values, noise that is usually called dither noise. This causes the image data values to vary slightly but in a random pattern, breaking up the artifacts and at the very least makes them less noticeable. For this to work, the amount of noise is based on the level of the artifacts. In the case of the oil painting artifact, the goal is to eliminate the artifact by adding the missing frequencies. This technique works because the noise that is added looks more natural than the lack of high frequency content. Most natural images have a frequency spectrum that when measured by amplitude follows a 1/f curve. If too much high frequency content is suppressed, even if the edges remain sharp, then the image will not look natural.

Many of dither patterns are either 'black or white' because they are based upon printing or are used to hide quantization noise and only require two levels. In addition, these patterns are not typical random noise, such as Gaussian white noise, which can be very annoying because of the low frequency content, but instead are biased towards higher frequencies. The 'color' of noise is based upon the spatial spectrum, with blue noise being high frequency noise. The super resolution process often removes more of the high frequency content in areas with texture while preserving the high frequency content near edges, so adding back in high frequency noise counteracts this and creates a more natural image. However, one cannot blindly add noise to the image. In areas where the original content has no texture, no noise should be added. In addition, areas there are close to black or white also typically have very little texture and therefore need very little noise added.

FIG. 2 shows a flowchart of one embodiment of a method to add dither noise to image data. The super resolution image data is generated at 20. The image data is then analyzed at 22 to determine the image contents and the weights are assigned to image data based upon the contents, as will be discussed in more detail below. An alternative would be to measure the statistics in the original image and then use that to determine the amount of noise to be added, or to combine the above two methods. The noise generated at 24 is then applied to the image data based upon the weighting at 26. If the dither noise pattern resolution does not equal the super resolution image data resolution, the dither noise pattern could be clipped, made periodic, reversed, expanded, etc. The process may adapt the noise generation process to boost the high frequency content, as discussed above. Many different options exist for the noise generation, including using a template, high pass filtering random noise, and dither noise generation based on a half-tone image among others.

FIGS. 3 and 4 show embodiments of alternative noise generation techniques. In FIG. 3, a random noise generation process 30 generates random noise. For example, many algorithms exist to generate Gaussian noise with good performance. At 32, the process may apply a low pass filter, such as in a 5 pixel by 5 pixel (5×5) window. The process then calculates the difference between the original noise and the low pass filtered version. The difference consists of the middle and/or high frequency parts of the original random noise, with the low pass filter controlling the frequency distribution of the dither noise. The process then limits the dither noise at 34 into a predefined range in order to avoid isolating points with very high magnitudes.

The process may then apply some further post-processing such as enhancement and up or down scaling at 36 and 38, respectively. This allows the dither noise to have the necessary sharpness and scale. The resulting dither noise may be stored in a look-up table (LUT), from where it can be accessed with different speeds and directions. This represents only one option for generation of dither noise. Other possibilities exist, such as the embodiment shown in FIG. 4.

FIG. 4 shows a flowchart of an embodiment to generate dither noise based upon a half-tone image. Half-toning techniques may generate halftone image which have two gray levels (white and black). It is desirable for the halftone image to possesses the blue noise property and not introduce annoying patterns. Fortunately, there are many excellent half-toning methods which can generate satisfactory performance. Some dithering methods originate from error diffusion methods mentioned because of their simplicity and validity. In the embodiment shown in FIG. 4, a half-tone image is generated using error diffusion at 40. In order to make the dither noise independent from the SR image, a constant gray image having, for example, a level of 128 out of 256 is to be half-toned. There are several different methods of error diffusion.

After getting the halftone image, random noise generated at 30 is overlaid on the halftone image at 42 possibly based on the following processes.

For pixel p in the half-tone image, the random noise is rn, the dither noise dn is calculated as:

if $p$ is white, $dn = abs(rn)$;

else $dn = -abs(rn)$.

Typically, the white and black pixels have Bernoulli distribution in the half-tone image, 50% of the pixels are white ones, and 50% of the pixels are black ones.
The mean M of dither noise is equals to 0.

$M = \int_{-\infty}^{0} x p_a(|x|)/2 dx + \int_{0}^{+\infty} x p_a(|x|)/2 dx = 0$.

Here $p_a(x)$ is the distribution of absolute value of random noise. This will not change the average brightness of the SR image. The variance V of dither noise is equal to that of random noise.

$$V = \int_{-\infty}^{0} x^2 p_a(|x|)/2 dx + \int_{0}^{+\infty} x^2 p_a(|x|)/2 dx = \int_{0}^{+\infty} x^2 p_a(|x|) dx = \int_{-\infty}^{+\infty} x^2 p(x) dx$$

Here p(x) is the distribution of random noise. The generated dither noise keeps the same mean and variance as the original random noise. Because the pixel distribution of the halftone image is maintained, the dither noise also possesses the blue-noise property and has no annoying patterns. After getting the raw dither noise, some post-processing, such as applying a limit at 44, noise enhancement 46, upscaling, or downscaling at 48, are used to produce the expected sharpness and scales of the noise grains.

Regardless of how the noise is generated and shaped prior to application, it will be applied adaptively based upon the image content. For example, in a smooth region, it is better to add less or even no dither noise. The addition of noise in regions of detail and texture makes the details richer and more natural. Similarly, adding dither noise to very dark or very bright regions generally degrades the image, while the addition to regions of moderate brightness does not. The embodiments of the process here will take into account the texture and brightness of the image data to determine a weight. The process then applies the noise according to the weight. FIG. 5 shows an embodiment of a weighting process.

Figure 6:
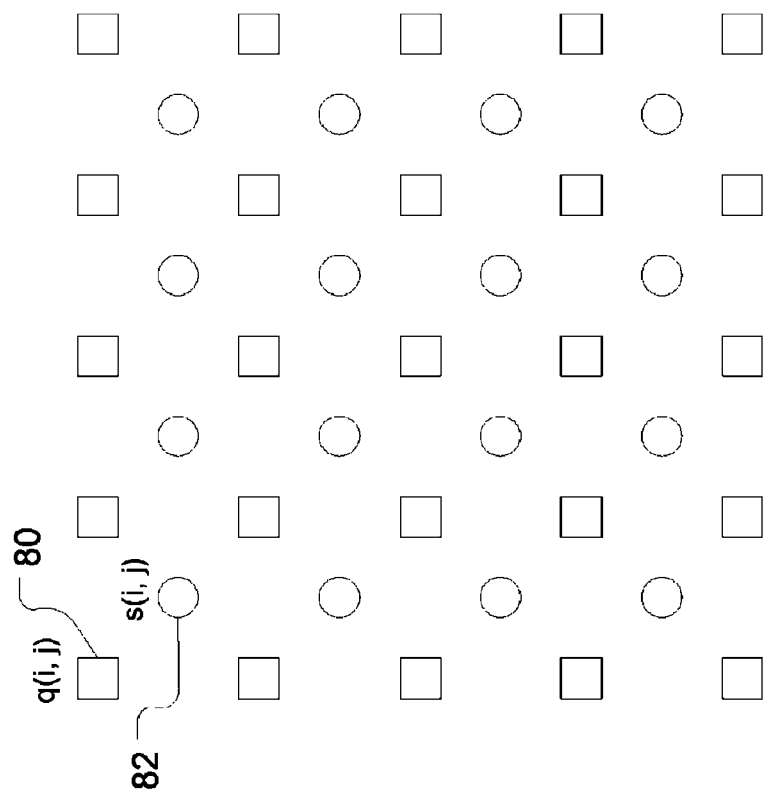
FIG. 6 shows an example of a window of pixels for determining sample error.

The process of FIG. 5 are applied to small regions of the super resolution data in turn, such as block of pixels. No limitation to such an approach is intended, nor should any be implied. The two branches of the process may occur in parallel up to the point where the weights are blended. In the top branch, the image contents undergo analysis for texture and detail. At 52, a sample error is calculated for the block. In order to determine the sample error, the pixels in the block are offset by some uniform measure, such as by a half pixel. FIG. 6 shows an example.

In FIG. 6, the block of image data Q has pixels at position q(i,j), such as 80. The pixels are then shifted a half pixel position right and a half pixel down to form S, resulting in pixels positions such as 82 at s(i,j), s(i, j)=(q(i, j)+q(i, j+1)+q(i+1, j)+q(i+1, j+1))/4. The sample error of is then determined. In one embodiment, the sample error may be the sum of absolute differences (SAD) between Q and S.

$$\text{samp\_err} = \sum_{i=0, j=0}^{i<4, j<4} abs(q(i, j) - s(i, j)).$$

Figure 7:
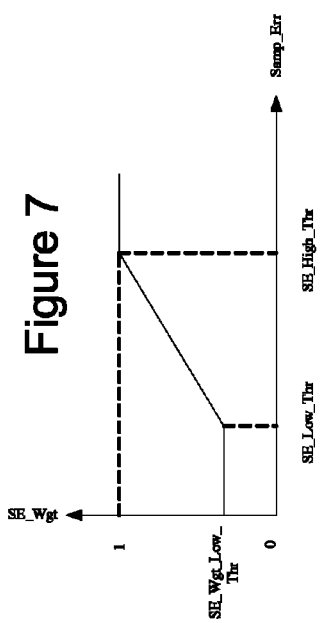
FIGS. 7 and 8 shows graphical representations of weighting calculations based upon image content.

The process adjusts sample error at 54 by use of erosion in a particular window centered around the current block. It finds the first two minimal sample errors in the window and averages them. This average is used to the replace current sample error, making the error measurement more consistent. The process then applies a low pass filter at 56 to the resulting error to produce a refined sample error image. If the refined sample error is small, the region is smooth. When the image data transitions from the smooth regions to textured regions, the sample error becomes larger and larger. The sample errors often reach their maximum in the interior of the texture regions. Once the sample error is refined, the weight calculation is applied using a monotonic function at 58. One example, of a monotonic function is a piecewise linear fashion. An example of this function is shown in FIG. 7.

Figure 8:
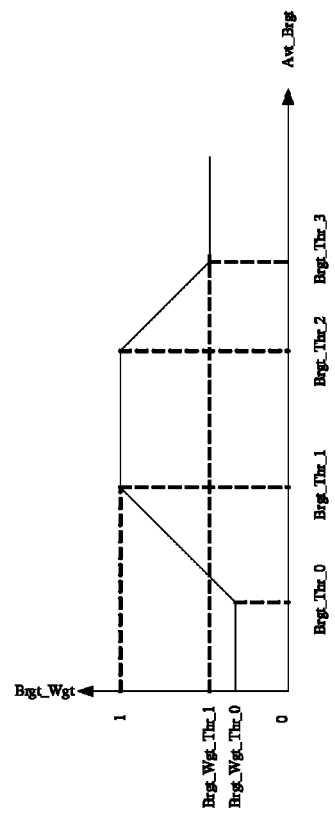

Similar to the analysis of the image data to detect texture, the process also determines the brightness of the image content. Again, in this embodiment, the brightness calculation is done in smaller regions of the image data in turn, but no such limitation is intended nor should one be implied. The average brightness is a sum of the luma values for each pixel in the block divided by the number of pixels in the block. This resulting value is then low pass filtered in a window at 62. The resulting brightness value is then weighted such that mid level brightness values have a larger weight at 64. One possibility is a piecewise linear function using one or more thresholds, as shown in FIG. 8.

Returning to FIG. 5, the sample error weight se_wgt and the brightness weight brgt_wgt are blended at 66 for each block. One embodiment of the blending process may be:

min_wgt=min(*se*_wgt,brgt_wgt);

max_wgt=max(*se*_wgt,brgt_wgt);

blk_wgt=min_wgt+Blend_*K**(max_wgt−min_wgt).

The blk_wgt is the blended weight, and Blend_K is a programmable value that is set by the device manufacturer or the user of the device to tune the response of the system.

The block weight is then further refined at 68 as needed. In one embodiment, the block weight is low pass filtered in a window to arrive at a low pass filtered weight. The maximum between the low pass filtered weight and the block weight is then selected as the refined block weight.

Figure 9:
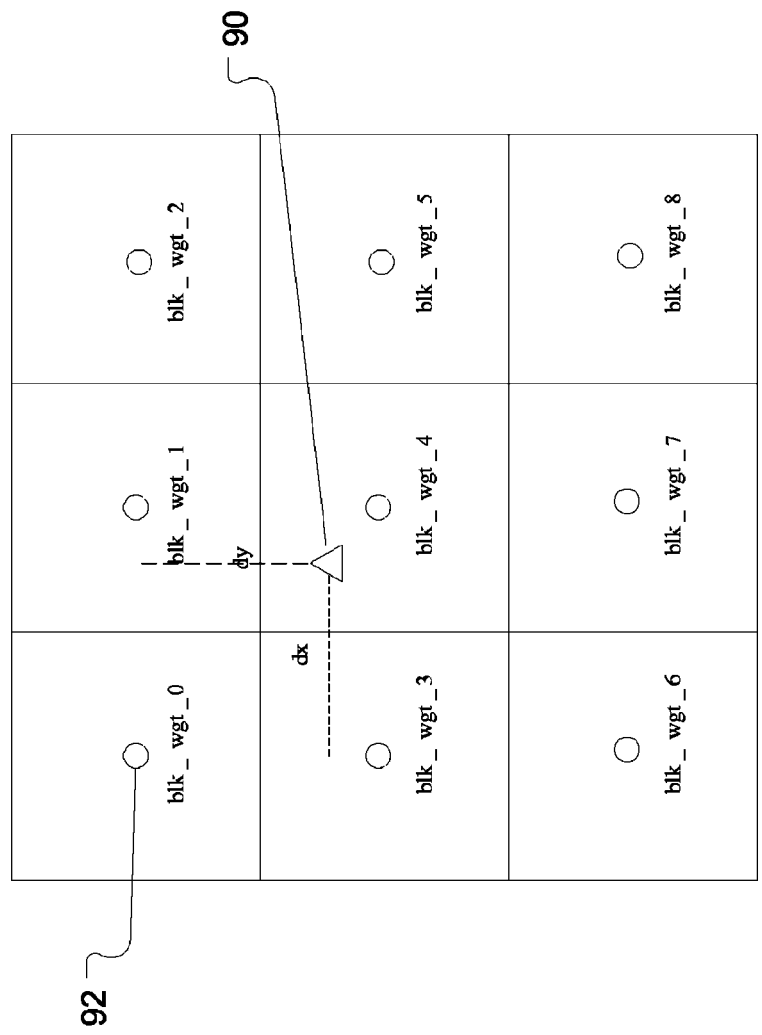
FIG. 9 shows a graphical representation of a pixel-based weight decomposition.

Because the weight is block based, the block weight needs to be decomposed to the pixel level at 70. One simple decomposition method may adopt bilinear decomposition. FIG. 9 shows an example for solving the weight of the triangle pixel. Its block weight is blk_wgt_4. The process finds 4 neighboring block weights whose position is closest to the triangle pixel, which are blk_wgt_0, blk_wgt_1, blk_wgt_3 and blk_wgt_4. The horizontal distance between the triangle pixel and center corresponding to blk_wgt_3 is dx, and the vertical distance between triangle pixel and center corresponding to blk_wgt_1 is dy. The pixel weight is calculated as follows:

wgt_*ht*=(blk_wgt_0*(*Bs−dx*)+blk_wgt_1*dx*)/*Bs*;

wgt_*hb*=(blk_wgt_3*(*Bs−dx*)+blk_wgt_4*dx*)/*Bs*;

pix_wgt=(wgt_*ht**(*Bs−dy*)+wgt_*hb**dy*)/*Bs*.

Here, suppose block size is Bs*Bs.

An alternative decomposition method whose performance is much better than bilinear decomposition is to apply bilateral filtering. Initialize pixel weight (raw_pix_wgt) for each pixel with its corresponding block weight. Then, refine the pixel weight based on bilateral filtering in 5×5 window as follows:

$$\text{pix\_wgt}(i, j) = \sum_{(m,n) \in N(i,j)} w(m, n) * \text{raw\_pix\_wgt}(m, n).$$

Here w(m, n) are the blending coefficients that are calculated according to the color difference and spatial distance between pixel(m,n) and pixel(i,j). For example, w(m,n) comes from a monotone-decreasing exponential function with respect to color difference and spatial distance.

After getting the weight pix_wgt and the dither noise dither_noise for each pixel, the process adds the dither noise to original high-resolution pixel pix_sr based on the weight at 26 of FIG. 2 as follows.

pix_*sr*_out=pix_*sr*+dither_noise*pix_wgt.

Here, pix_sr_out is the output high resolution pixel.

In this manner, a super resolution image is improved by alleviated or eliminating artifacts that may result from a lack of high frequency detail. The embodiments disclosed here make video images looks and more natural.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of producing a high resolution image, comprising:
    generating high resolution image data for a high resolution image using a processor, wherein the high resolution image has a resolution higher than a resolution of an original image;
    determining image content of the high resolution image data on a block basis, where the image is divided into blocks of multiple pixels;
    weighting each block of image data based upon the image content;
    decomposing the weights for each block to the pixels of the block;
    selectively adding dither noise to the pixels of the high resolution image data based upon the weight for each block to produce final image data.

2. The method of claim 1, wherein generating the high resolution image data comprises applying one of one-dimensional upscaling.

3. The method of claim 1, wherein generating the high resolution image data comprises generating super resolution image data by one of single frame super resolution, multi-frame super resolution, or self-similarity super resolution to original image data.

4. The method of claim 1, wherein determining image content comprises analyzing the image data to determine at least one of image texture and brightness.

5. The method of claim 1, wherein weighting each block of for image data comprises assigning a higher weight to image data having more texture than image data with less texture.

6. The method of claim 1, wherein weighting each block of image data comprises assigning a lower weight to image data having high or low brightness and assigning a higher weight to image data having a moderate brightness.

7. The method of claim 1, further comprising generating dither noise.

8. The method of claim 7, wherein generating dither noise comprises modifying a pre-existing pattern of dither noise.

9. The method of claim 7, wherein generating dither noise comprises applying a high pass filter to random noise.

10. The method of claim 7, wherein generating dither noise comprises producing a halftoned image and overlaying random noise on the half-toned image.

11. The method of claim 7, wherein generating dither noise further comprises enhancing dither noise and/or resampling dither noise.

12. An apparatus, comprising:
- an image processor configured to receive original image data at a first resolution and generate super resolution image data at a second resolution higher than the first resolution;
- a post processor configured to receive the super resolution image data, divide the super resolution image data into block, weight each block depending upon image data, decompose the weights for the blocks to pixels, and apply dither noise according to the weights to the super resolution data to produce improved super resolution image data.

13. The apparatus of claim 12, wherein the image processor and the post processor are portions of the same processor.

14. The apparatus of claim 12, wherein the image processor and the post processor are separate processors.

* * * * *